United States Patent [19]
Nadgauda et al.

[11] Patent Number: 5,987,032
[45] Date of Patent: Nov. 16, 1999

[54] HIERARCHICAL RESOURCE HOPPING METHOD, SYSTEM, BASE STATION, HEAD-END UNIT, AND SUBSCRIBER UNIT FOR VARIABLE RESOURCE SIZE COMMUNICATION SYSTEMS

[75] Inventors: Nikhil Shashank Nadgauda, Chicago; Brian Keith Classon, Mt. Prospect; Kevin Lynn Baum, Rolling Meadows, all of Ill.

[73] Assignee: Motorola, Inc., Schaumburg, Ill.

[21] Appl. No.: 08/824,880

[22] Filed: Mar. 26, 1997

[51] Int. Cl.$^6$ ....................................... H04J 13/06
[52] U.S. Cl. ......................... 370/437; 375/202; 375/203
[58] Field of Search ..................... 370/319, 330, 370/343, 344, 468, 478, 480, 437, 487, 539, 541; 375/202, 203, 267, 299, 347

[56] References Cited

U.S. PATENT DOCUMENTS

| | | | |
|---|---|---|---|
| 4,763,322 | 8/1988 | Eizenhofer | 370/95 |
| 4,870,642 | 9/1989 | Nohara et al. | 370/75 |
| 5,305,314 | 4/1994 | Edblad et al. | 370/79 |
| 5,442,660 | 8/1995 | Kuo et al. | 375/202 |
| 5,583,851 | 12/1996 | Kato et al. | 370/342 |
| 5,818,829 | 10/1998 | Raith et al. | 370/347 |

OTHER PUBLICATIONS

Andy D. Kucar, "Mobile Radio: An Overview", IEEE Communications Magazine, pp. 72–85, Nov. 1991.
Masato Hayashi, "a Study on Satellite Channel Assignment Method having Control of Call Loss Probability for Carriers with Different Transmission Bandwidths under FDMA Operation", IEEE, pp. 1006–1010, May, 1996.
G.B. Bleazard, "Introducing Satellite Communications", NCC Publications, pp. 232–233, 1985.

*Primary Examiner*—Melvin Marcelo
*Attorney, Agent, or Firm*—Darleen J. Stockley

[57] ABSTRACT

A method (300), system (400), base station (500), head-end unit (600), and subscriber unit (700) provide for efficient resource hopping in a communication system or group of communication systems supporting a plurality of communication units, where different communication units may have varying resource size requirements. The method includes the steps of: assigning a communication unit of the plurality of communication units to a resource slot within a level of a plurality of levels of a hierarchical representation of a resource region, assigning an available resource hopping pattern and associated initial resource location within the resource slot to the communication unit, and hopping, by the communication unit in accordance with a predetermined hierarchical resource hopping scheme.

81 Claims, 6 Drawing Sheets

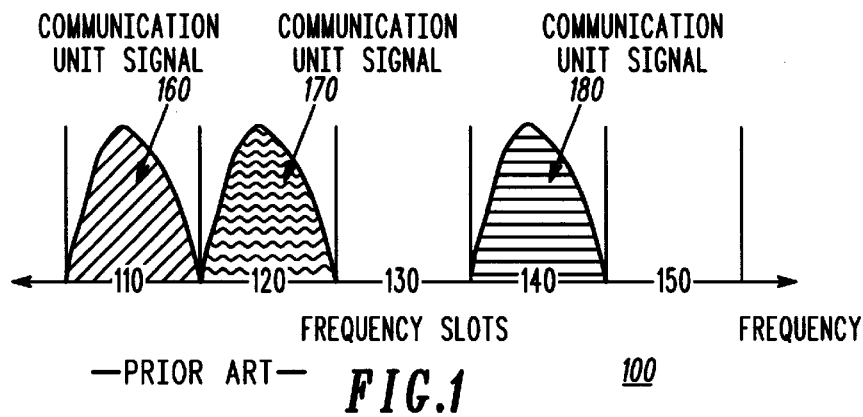
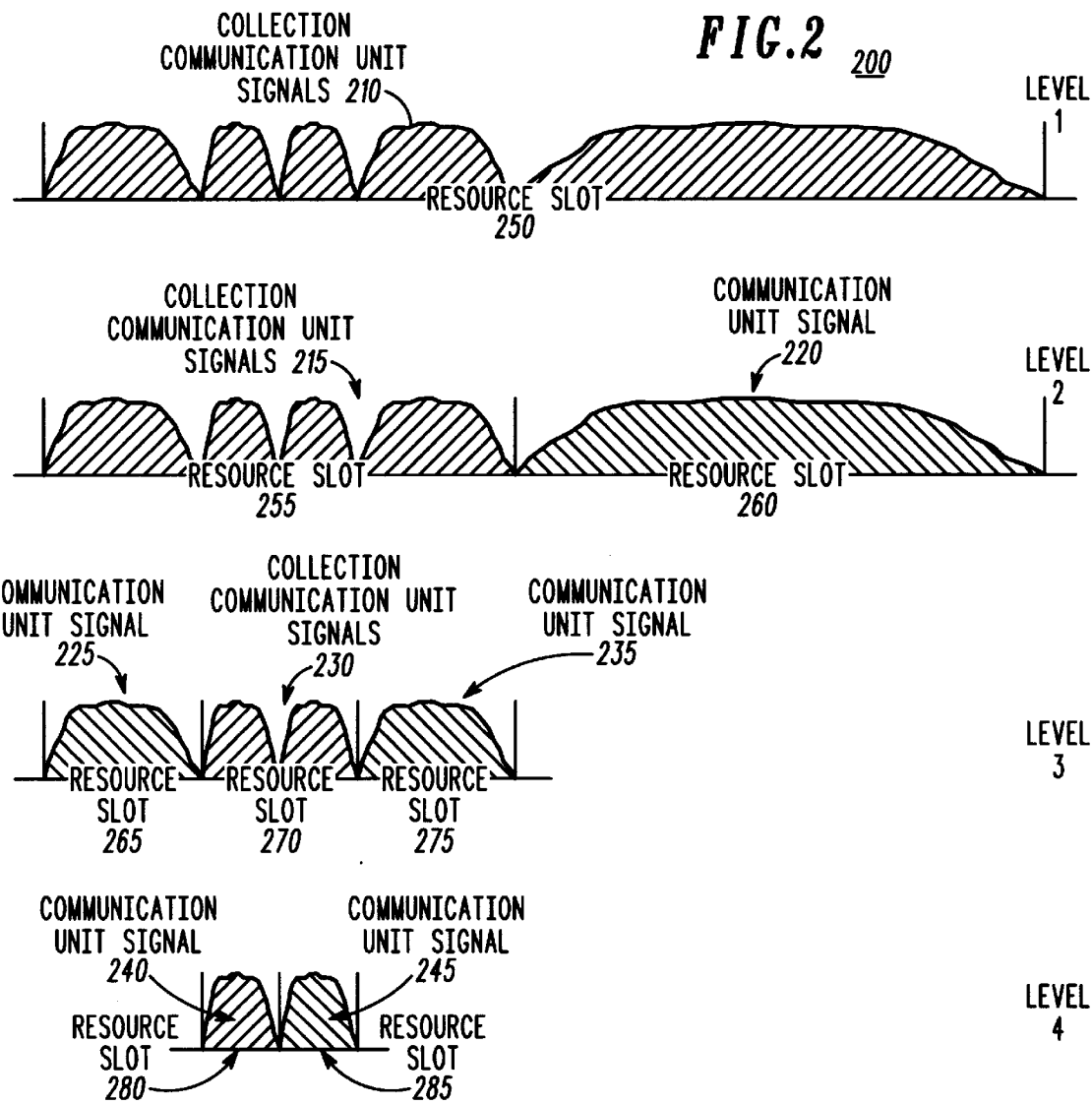

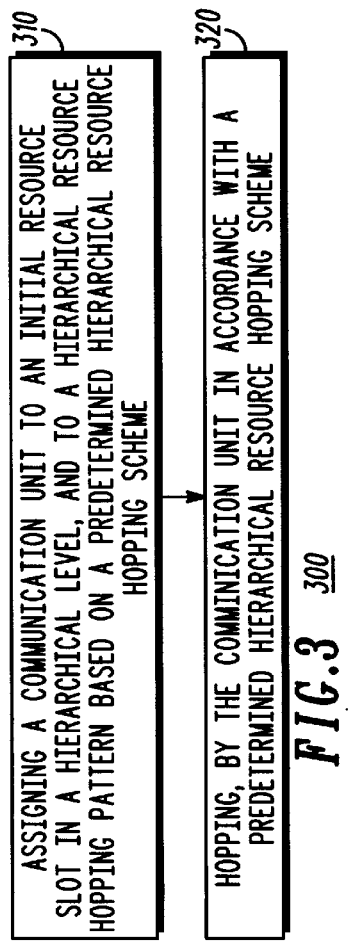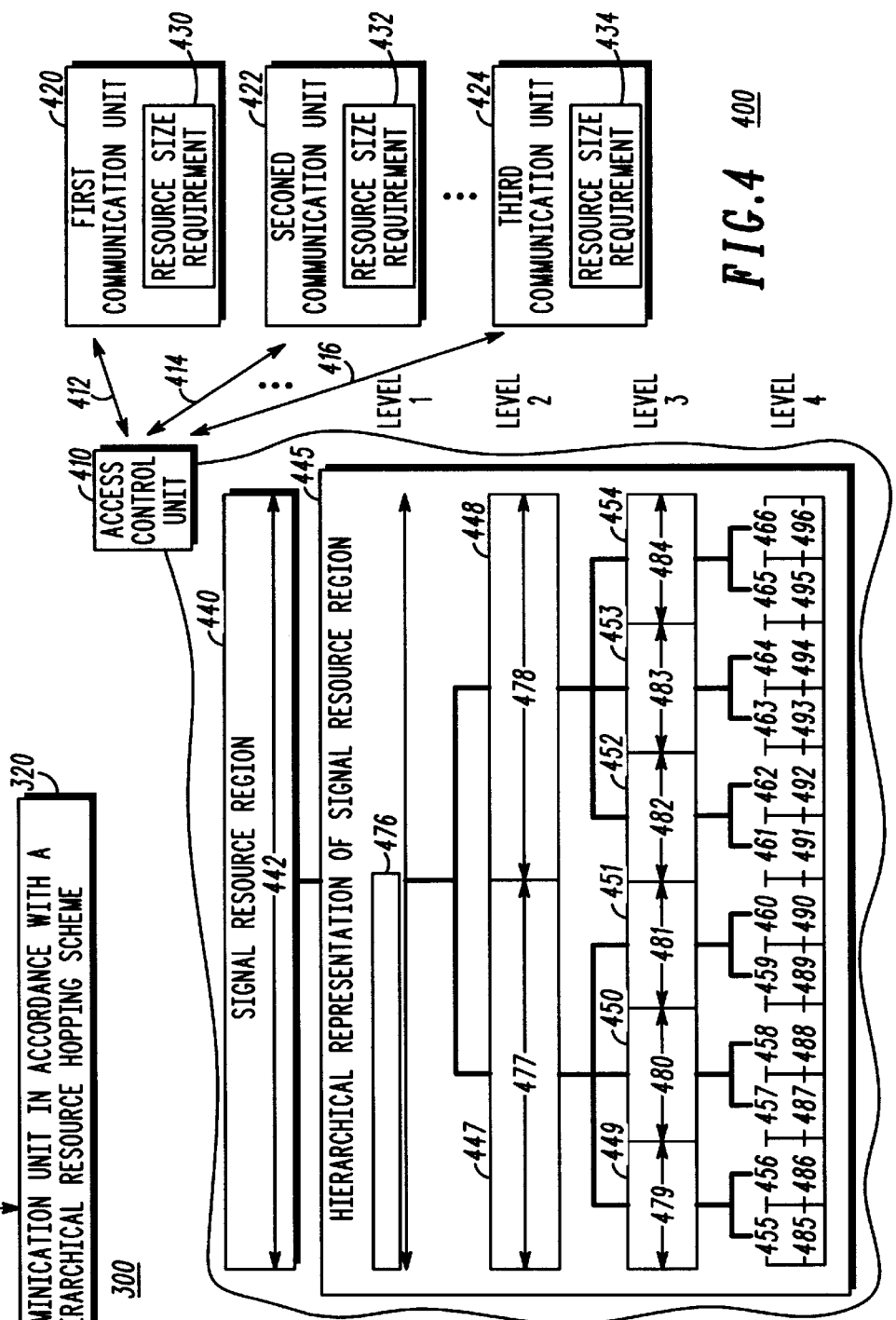

HIERARCHICAL RESOURCE HOPPING METHOD, SYSTEM, BASE STATION, HEAD-END UNIT, AND SUBSCRIBER UNIT FOR VARIABLE RESOURCE SIZE COMMUNICATION SYSTEMS

RELATED APPLICATION

The present application is related to Hierarchical Resource Management Method, System having Ser. No. 08/824,497, Base Station, Head-End Unit And Subscriber Unit For Variable Resource Size Communication Systems, by Nikhil Shashank Nadgauda, Kevin Lynn Baum, and Brian Keith Classon, assigned to Motorola, Inc., and filed concurrently on Mar. 26, 1997.

FIELD OF THE INVENTION

The present invention relates generally to hopping for communication systems, and in particular, to hopping for communication systems which support multiple resource sizes.

BACKGROUND OF THE INVENTION

Hopping methods are known to provide performance benefits in wireless communication systems. For example, frequency hopping methods can significantly improve communication system performance by providing a frequency diversity mechanism and an interferer diversity mechanism. Similarly, time hopping methods can also improve communication system performance by providing a time diversity mechanism and an interferer diversity mechanism. Furthermore, both frequency hopping methods and time hopping methods can improve performance in fixed access or low-mobility communication systems by providing nearly independent fading from hop-to-hop in an environment that would otherwise be very slowly fading. In this latter case, the independent fading from hop-to-hop improves the effectiveness of forward error correction coding.

It is straightforward to implement a resource hopping method for a communication system which supports a plurality of communication units with uniform resource size requirements. Uniform resource size requirements imply that each communication unit operates with the same bandwidth, time-slot length, or more generally the same amount of any of the radio signal resources known in the art. In the case where the resource being hopped is the frequency of a signal, the available spectrum is divided into equal-width frequency slots, with the width of each slot being equal to the communication unit signal bandwidth. A communication unit is then able to transmit or receive within one of the available frequency slots. Frequency hopping in the communication system is facilitated by having the active communication units switch frequency slot assignments according to a set of predefined frequency hopping patterns. Switching frequency slot assignments may also be described as the changing of the center frequency of a signal to the center of a different frequency slot.

Generating frequency hopping patterns for a communication system that uses uniform bandwidth frequency slots is well known in the art. Similarly, generating time hopping patterns for communication systems with uniform sized time slots is also well known in the art. However, the prior art hopping methods are not applicable to a communication system or group of communication systems which support multiple resource sizes. Therefore, a need exists for a method, system, base station, head-end unit, and subscriber unit that provide for efficient resource hopping in a communication system or group of communication systems supporting a plurality of communication units, where different communication units may have different or varying resource size requirements.

BRIEF DESCRIPTION OF THE DRAWINGS

FIG. 1 is a diagrammatic representation of a system frequency region, or bandwidth, divided into uniform size frequency slots for a plurality of uniform bandwidth communication units as is known in the art.

FIG. 2 is a diagrammatic representation of one embodiment of a system resource region divided into a hierarchical set of different size resource slots for a plurality of variable resource size communication units in accordance with the present invention.

FIG. 3 is a flowchart of steps of a method in accordance with one embodiment of the present invention.

FIG. 4 is a diagrammatic representation of one embodiment of a communication system in accordance with the present invention.

DETAILED DESCRIPTION OF A PREFERRED EMBODIMENT

Figure 5:
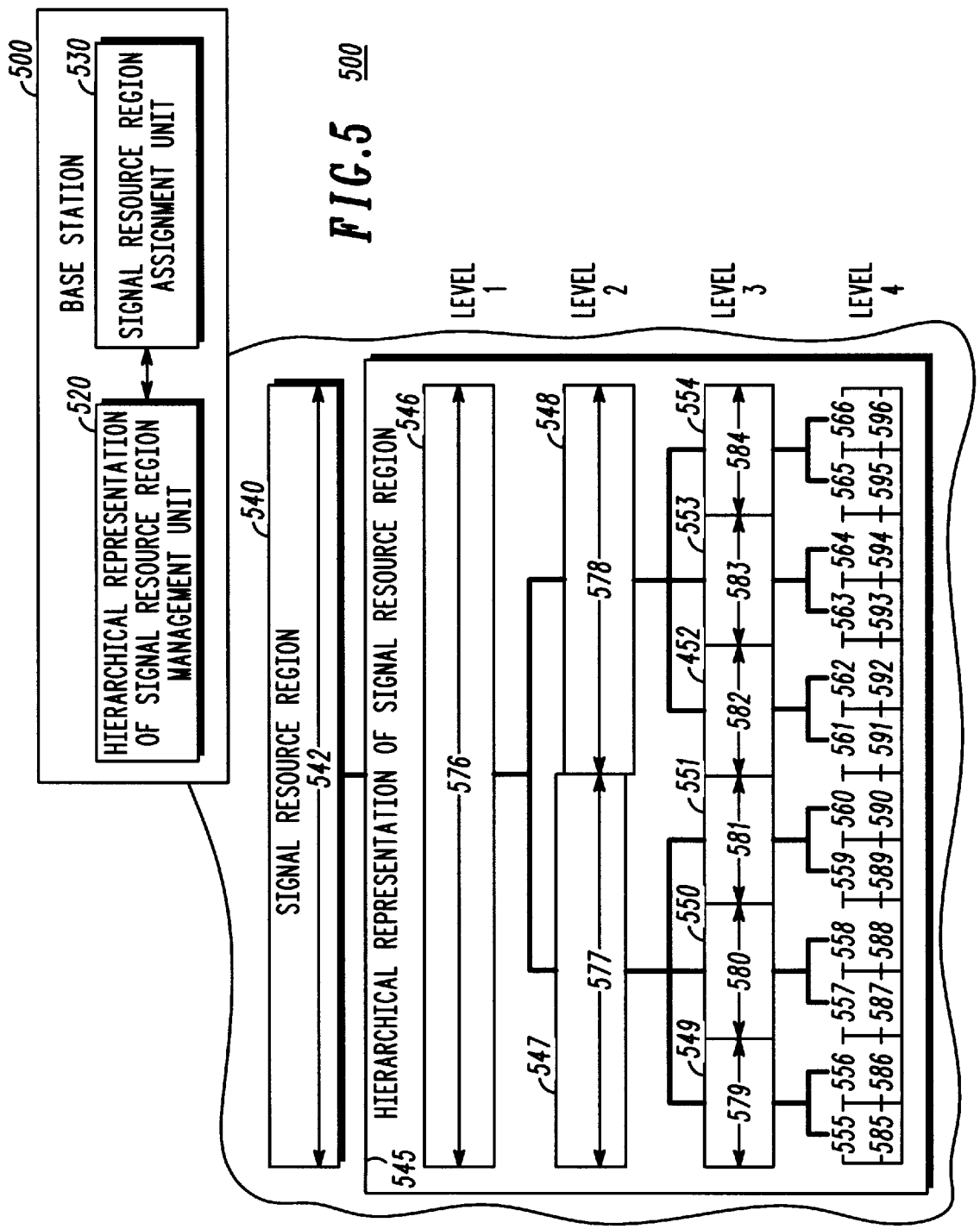
FIG. 5 is a diagrammatic representation of one embodiment of a base station in accordance with the present invention.

The present invention provides a hierarchical resource hopping method, system, base station, head-end unit, and subscriber unit for a communication system which supports a plurality of resource sizes. It is desirable for a communication system to support a plurality of resource sizes so that the capabilities and cost of the subscriber units may be scaled in accordance with the throughput requirements of the user. For example, a voice communication unit may be inexpensive and require only a small amount of radio signal bandwidth, while a high speed data communication unit may be more expensive and require several times the bandwidth of the voice communication unit. In this example, the communication system supports two resource sizes (i.e., one resource size for each type of subscriber unit). In this example, a resource size is the signal bandwidth. Likewise, in a purely TDM/TDMA (time division multiplex/time division multiple access) based system, a voice communication unit may require the use of only one time slot per frame, whereas the high speed data communication unit may require the use of multiple time slots in each TDM/TDMA frame. When time hopping is used in this type of a TDM/TDMA system, a resource slot may include one or more time slots in a frame. In a CDMA (code division multiple access) system, the resource size is determined by the number of codes allocated to a communication unit or the spreading factor associated with a particular communication unit. Combinations of different bandwidths and different numbers of time slots or codes may also be used to support different communication units with different throughput requirements. A combination of two or more radio resources such as this will also generally be referred to as a resource.

The present invention provides a method, system, base station, head-end unit, and subscriber unit that provide for efficient resource hopping in a communication system or group of communication systems supporting a plurality of communication units, where different communication units may have different or varying resource size requirements. The present invention facilitates efficient resource hopping by imposing a hierarchical resource slot structure on the signal resource region in consideration of the various resource sizes necessitated by the plurality of communication units, assigning each communication unit to a resource slot within a level of hierarchy commensurate with the resource size necessitated by the communication unit, and hopping the communication unit signals within each level of the hierarchy. The invention provides the general benefits of uniform slot width resource hopping, which may include, but is not limited to, frequency diversity, time diversity, and interferer diversity, to the aforementioned communication system or group of communication systems having a plurality of communication units with varying resource size requirements. The term resource is used here to refer to any of the communication system radio signal resources, including, but not limited to, all or part of a time frame, all or part of a frequency band, one or more codes, or some combination of these.

For a communication system which supports a plurality of communication units with non-uniform resource size requirements, implementing a resource hopping method is not straightforward. Generally, these communication systems consist of, but are not limited to, a base station/head-end unit and one or more communication units/subscriber units having different resource size requirements due to different throughput requirements. In this scenario, the prior-art notion of a hopping method is not applicable because the differing resource sizes necessitate not only varying numbers of resource slots, but also varying size resource slots. Prior-art hopping methods for multiple user communication systems generally require uniform resource sizes to attain efficient resource usage and to prevent collisions and mutual interference between the signals of the multiple users.

The present invention facilitates efficient resource hopping by creating a hierarchical resource slot structure in the signal resource region in accordance with the different resource sizes necessitated by the plurality of communication units, and by hopping the communication unit signals within each level of the hierarchy. The invention provides the general benefits of resource hopping, possibly including, but not limited to, frequency diversity, time diversity, and interferer diversity, to the aforementioned communication system or group of communication systems supporting a plurality of communication units with different resource size requirements.

The present invention can be more fully described with reference to FIGS. 1, numeral 100, and FIGS. 4–10, numerals 400, 500, 600, 700, 800, 900, and 1000, respectively.

FIG. 1 refers to a prior-art frequency hopping method to provide a reference point, showing a resource region, which in this case is a frequency region, or bandwidth, divided into same-size resource slots, which in this case are equal-width frequency slots (110, 120, 130, 140, 150). In this illustration, three of the five frequency slots are occupied by signals (160, 170, 180) each from a different communication unit. Frequency hopping is facilitated by having these signals change frequency slot locations at specified times, according to a set of predefined hopping patterns, as is known in the art. Such prior art hopping methods for systems with uniform resource sizes will be referred to as uniform width hopping methods. Likewise, the hopping patterns used in uniform width hopping methods will be referred to as uniform width resource hopping patterns.

FIG. 4 illustrates an exemplary communication system (400) in accordance with the present invention. The communication system (400) includes an access control unit (410), a plurality of communication units (420, 422, . . . , 424), each with different resource size requirements (430, 432, . . . , 434), and a plurality of coupling mechanisms (412, 414, . . . , 416). Among the primary functions of the access control unit (410) are allowing or disallowing communication units to access the communication system and assigning communication units which are allowed to access the communication system to a resource slot in a hierarchical representation of a resource region in accordance with the present invention. In a preferred embodiment, the access control unit (410) is a base station, such as a base station for a cellular radio communication system. In an alternate embodiment, the access control unit (410) is a head-end unit. In another alternate embodiment, the access control unit (410) is a subscriber unit. In a preferred embodiment each communication unit (420, 422, . . . ,424) is a subscriber unit. In a preferred embodiment, each coupling mechanism (412, 414, . . . 416) is a wireless radio link. In an alternate embodiment, coupling mechanisms (412, 414, . . . ,416) are provided by a wireline cable link.

The access control unit (410) and the plurality of communication units (420, 422, . . . ,424) use a signal resource region (440) for the transmission and/or reception of signals. Note that the present invention is equally applicable to communication from the access control unit (410) to the communication units (420, 422, . . . , 424), communication from the communication units (420, 422, . . . , 424) to the access control unit (410), and communication among the plurality of communication units (420, 422, . . . , 424). The invention may be employed in either or all types of links, so hereafter no distinctions will be made between transmission and reception or the three types of links. Resource region (440) has a corresponding resource region size (442). In a preferred embodiment, the signal resource region (440) is a predetermined frequency band. In an alternate embodiment, the signal resource region (440) is a predetermined TDM/TDMA time frame. In another alternate embodiment, the signal resource region (440) represents a predetermined set of code sequences. In yet another alternate embodiment, the signal resource region (440) is a predetermined time-frequency plane.

Communication units (420, 422, . . . , 424) have different resource size requirements (430, 432, . . . , 434, respectively). The resource size requirement of a communication unit is preferably directly related to the throughput requirement of the communication unit. In one embodiment, a first resource size requirement (430) is exactly three times the size of a second resource size requirement (432), and the second resource size requirement (432) is exactly two times the size of a third resource size requirement (434).

The hierarchical representation of a resource region (445) is formed by recursively dividing the signal resource region (440) into sets of smaller resource regions. The first level of hierarchy defines a resource slot (446) whose size (476) is equal to the resource region size (442). In this example, a first communication unit (420) has the largest resource size requirement (430), and the size (442, 476) of the resource region (440, 446) is exactly twice the size of the resource size requirement (430) for the first communication unit (420). The next level of hierarchy is the second level of hierarchy, which is defined by dividing the resource region (440, 446) into two smaller resource slots (447, 448) whose sizes (477, 478) are each equal to the resource size requirement (430) of the first communication unit (420), which is the largest resource size requirement.

The next level of hierarchy is the third level of hierarchy, which is defined by dividing the first smaller resource slot (447) into three smaller resource slots (449, 450, 451), and by dividing the second smaller resource slot (448) into three smaller resource slots (452, 453, 454) because the resource size requirement (432) for the second communication unit (422) is one-third of the resource size requirement (430) for the first communication unit (420). The sizes (479, 480, 481, 482, 483, 484) of resource slots (449, 450, 451, 452, 453, 454) are each equal to the resource size requirement (432) of the second communication unit (422).

The next level of hierarchy is the fourth and final level of hierarchy in this embodiment, which is defined by dividing each resource slot (449, 450, 451, 452, 453, 454 into two smaller resource slots, because the resource size requirement (434) for the third communication unit (424) is one-half the resource size requirement (432) of the second communication unit (422). Each smaller resource slot (449; 450; 451; 452; 453; 454) is divided to form two resource slots (455, 456; 457, 458; 459, 460; 461, 462; 463, 464; 465, 466). Each resource slot (455, 456; 457, 458; 459, 460; 461, 462; 463, 464; 465, 466) in the fourth level of hierarchy has a size (485, 486; 487, 488; 489, 490; 491, 492; 493, 494; 495, 496) which is equal to the resource size requirement (434) of the third communication unit (424).

In a preferred embodiment, the size of the resource slots on a given level will equal the resource size necessitated by a given communication unit. In an alternate embodiment, the size of the resource slots on a given level will be slightly greater than the resource size necessitated by a given communication unit. In a preferred embodiment, the number of levels in the hierarchical representation of the resource region (445) will be one greater than the number of differing resource requirements among the plurality of communication units. In a preferred embodiment, the number of resource slots on a given level within the hierarchy will be a multiple of the number of resource slots on the prior level within the hierarchy.

Generally, it is preferable for all of the resource sizes to be supported by the communication system to be specified before the communication system is deployed so that the hierarchical representation of the resource region (445) can be defined when designing and planning the communication system (400). However, in an alternate embodiment, the hierarchical representation of the resource region (445) will be defined while the communication system (400) is in operation to provide greater flexibility. In a preferred embodiment, the hierarchical representation of the resource region (445) may be modified according to a predetermined modification-replacement scheme as the resource size requirements among the plurality of communication units change. Possible changes include, but are not limited to, the addition of new levels and the deletion of existing levels. The access control unit (410) maintains the hierarchical representation of the resource region (445) and assigns communication units to particular resource slots within the hierarchical representation of the resource region (445).

Once the hierarchical representation (445) of the resource region (440) is defined, each communication unit among the plurality of communication units can be assigned to a resource slot within the hierarchical representation (445). In a preferred embodiment this assignment takes place as the communication unit comes on-line or accesses the communication system, either to transmit or receive. In an alternate embodiment, this assignment is determined when the communication system is being designed or planned. Each communication unit is assigned to an initial resource slot on a hierarchical level commensurate with the resource size requirement of the communication unit.

In a preferred embodiment, a communication unit is assigned to a resource slot such that the size of the designated resource slot is greater than or equal to the resource size requirement of the communication unit and the size of a resource slot on the next level in the hierarchy after the level containing the designated resource slot is smaller than the resource size requirement of the communication unit. In another preferred embodiment, a communication unit is assigned to a resource slot such that the size of the designated resource slot is greater than or equal to the resource size requirement of the communication unit and the size of the designated resource slot is less than two times the resource size requirement of the communication unit. In either preferred embodiment, a new level of hierarchy is added if the smallest resource size supported by the communication system is less than half of the size of the smallest resource slot. In this illustrative example, the first communication unit (420) is assigned to one of the resource slots (447, 448) of the second level of hierarchy, the second communication unit (422) is assigned to one of the resource slots (449, 450, 451, 452, 453, 454) of the third level of hierarchy, and the third communication unit (424) is assigned to one of the resource slots (455, 456, 457, 458, 459, 460, 461, 461, 462, 463, 464, 465, 466) of the fourth level of hierarchy.

When a communication unit is assigned to an initial resource slot, it is also assigned to a hierarchical resource hopping pattern encompassing the designated resource slot. The hierarchical resource hopping pattern can be considered a hierarchical superposition of one or more uniform width resource hopping patterns, each of which describes how the contents of one or more resource slots on a given level potentially change locations. These uniform width resource hopping patterns can be generated using any uniform width resource hopping pattern generation method known in the art.

In this illustrative example, the signal resource region has a resource slot (446) that defines the first level of hierarchy. Since the signal resource slot (446) occupies the entire signal resource region (440), it is encompassed by only a trivial uniform width resource hopping pattern. In the next level of hierarchy, the signal resource slot (446) is subdivided into a first smaller resource slot (447) and a second smaller resource slot (448). These two resource slots are encompassed by a pair of uniform width resource hopping patterns. A signal occupying the first smaller resource slot (447) can either move into the second smaller resource slot (448) or remain in the first smaller resource slot (447), and, in turn, a signal occupying the second smaller resource slot (448) can either move into the first smaller resource slot (447) or remain in the second smaller resource slot (448). Continuing, the first smaller resource slot (447) may be subdivided into three smaller resource slots (449, 450, 451) and the second smaller resource slot (448) may be subdivided into three smaller resource slots (452, 453, 454). The three smaller resource slots (449, 450, 451) from the first smaller resource slot (447) are encompassed by a set of uniform width hopping patterns allowing a signal occupying any one of these resource slots to move into any one of the three resource slots (449, 450, 451). Similarly, the three resource slots (452, 453, 454) are encompassed by a set of uniform width hopping patterns allowing a signal occupying any one of these resource slots to move into any one of these three resource slots (452, 453, 454). The next level of hierarchy is defined by subdividing the six resource slots (449, 450, 451, 452, 453, 454) obtained in the third level of hierarchy to form twelve resource slots (455, 456, 457, 458, 459, 460, 461, 461, 462, 463, 464, 465, 466) of the fourth level of hierarchy. For example, two resource slots (455, 456) are created from a first resource slot of the third hierarchical level (449) and are encompassed by a pair of uniform width resource hopping patterns. A signal occupying either resource slot (455, 456) may remain in its current resource slot (455, 456) or move into the other resource slot (456, 455) in accordance with its respective hopping pattern. Hopping patterns for remaining resource slots (457–458, 459–460, 461–462, 463–464, 465–466) are defined in a similar fashion.

In a preferred embodiment, for all the resource slots on a given level within the hierarchy, the uniform width resource hopping patterns encompassing the resource slots on the next level in the hierarchy will be identical relative to the appropriate resource slot on the given level. Therefore in this illustrative example, the set of uniform width resource hopping patterns encompassing a first set of three resource slots of the third level of hierarchy (449, 450, 451), relative to the first resource slot of the second level of hierarchy (447), is the same as the set of uniform width resource hopping patterns encompassing the second set of three resource slots (452, 453, 454) of the third level of hierarchy, relative to the second resource slot of the second level of hierarchy (448).

In a preferred embodiment, the set of uniform width resource hopping patterns encompassing the resource slots within the hierarchy are specified before the communication system is deployed. In an alternate embodiment, the set of uniform width resource hopping patterns may be modified and/or replaced according to a predetermined modification-replacement scheme as the resource requirements among the plurality of communication units change.

As mentioned earlier, the hierarchical resource hopping pattern encompassing a resource slot on a given level within the hierarchy may be considered the hierarchical superposition of one or more uniform width resource hopping patterns. In this illustrative example, the hierarchical resource hopping pattern encompassing the second resource slot of the third level of hierarchy (450) may be formed by summing the uniform width resource hopping pattern encompassing the signal resource slot (446), relative to the center of the signal resource region (440), the uniform width hopping pattern encompassing the first resource slot of the second level of hierarchy (447), relative to the signal resource slot (446), and the uniform width resource hopping pattern encompassing resource slot (450), relative to the first resource slot of the second level of hierarchy (447).

In a preferred embodiment, the uniform width resource hopping patterns which make up the hierarchical resource hopping pattern for a given resource slot are stored independently, on a level-by-level basis and physical resource locations are computed by summing the uniform width resource hopping patterns as needed. In another preferred embodiment, the sum of the uniform width resource hopping patterns is precomputed and the ensuing hierarchical resource hopping pattern for a given resource slot is stored.

In a preferred embodiment, a fixed, non-hopped portion of the resource region (440) contains a reference signal. This reference signal may be used for synchronization by having it signal the beginning of the underlying hopping patterns. In another preferred embodiment, a particular resource slot or group of resource slots within the hierarchical representation (445) of the resource region (440) contains a reference signal or group of reference signals. These reference signals may be used for synchronization by having them signal the beginning of the hopping patterns within the hierarchy. In either of these embodiments, the aforementioned reference signal is transmitted by the access control unit (410).

In a preferred embodiment, hierarchical resource hopping is accomplished by having, on a resource slot by resource slot basis, the contents of a given resource slot on a given level within the hierarchical representation of the resource region potentially move to another resource slot on the same level within the hierarchy according to a hierarchical resource hopping pattern which encompasses both resource slots. Whether these contents consist of communication unit signals or collections of communication unit signals (210) as shown in the resource slot (250) of Level 1, the hierarchical resource hopping process encompassing each given resource slot is the same.

The hierarchical resource hopping concept may be more fully described with reference to FIG. 2, numeral 200, which shows a hierarchical representation of a resource region represented by Levels 1, 2, 3 and 4. In this illustrative example, a communication unit signal (220) is initially assigned, in Level 2, to a resource slot (260) in accordance with a preferred embodiment of this invention. As shown in Level 3, two communication unit signals (225, 235) are initially assigned to a first set of two resource slots (265, 275) respectively. Similarly, two other communication unit signals (240, 245) are initially assigned to a second set of two other resource slots (280, 285) respectively. As part of the hierarchical hopping process, the contents of the second set of resource slots (280, 285) potentially switch locations in accordance with the set of uniform width resource hopping patterns encompassing these resource slots. Similarly, the contents of the first set of resource slots and the resource slot making up the second set of resource slots (265, 270, and 275) potentially switch locations, in accordance with the set of uniform width resource hopping patterns encompassing these resource slots. It does not matter that the resource slot making up the second set of resource slots (270) contains a collection of communication unit signals (230) rather than a single communication unit signal of the same size as the communication unit signals (225, 235) for the first set of resource slots (265, 275). If the contents of the first set of resource slots and the resource slot making up the second set of resource slots (265, 270, and 275) switch locations, the collection of communication unit signals (230) may be treated as a single communication unit signal of equivalent total size, despite the fact that the underlying components, communication unit signals (240, 245), will be hopping at the same time. Continuing, the contents of the two resource slots (255, 260) of Level 2 potentially switch locations, in accordance with the set of uniform width resource hopping encompassing these resource slots. Again, at this level of the hierarchy, the collection of communication unit signals (215) in a first resource slot (255) of Level 2 may be treated as a single communication unit signal of equivalent width. Note that the hierarchical resource hopping scheme does not confine smaller size signals, such as the communication unit signals (240, 245) in Level 4 to a portion of the overall resource region. If the contents of the resource slot (270) of Level 3 that contains a collection of communication unit signals (230) switch locations with the contents of either of the other two resource slots (265, 275) of Level 3, the communication unit signals (240, 245) of Level 4 move accordingly. Similarly, these signals move to the other half of the resource region if the contents of one resource slot (255) of Level 2 switch locations with the contents of the other resource slot (260) of Level 2.

Once a communication unit is assigned to a resource slot and encompassing hierarchical resource hopping pattern, the communication unit may, as required, transmit and/or receive signals in that initial resource slot until the next cycle of the hopping pattern, after which a potentially new resource slot is used for transmission from and/or reception to the communication unit in accordance with the communication unit's hierarchical resource hopping pattern.

FIG. 5 illustrates a base station (500) in accordance with a one embodiment of the present invention. The base station (500) is an access control unit. The base station (500) manages the hierarchical representation (545) of the shared resource region (540) using a hierarchical representation of signal resource region management unit (520) and assigns communication units to appropriately sized resource slots within the hierarchy using a signal resource region assignment unit (530).

In a preferred embodiment, the base station (500) also computes physical resource locations by summing down a chain of stored resource slot offsets. Each resource slot has an associated offset relative to the center of the resource slot one level above it in the hierarchy. These offsets are stored and an overall physical resource location is computed by summing the appropriate offsets. This embodiment corresponds to having the uniform width resource hopping patterns which make up the set of hierarchical resource hopping patterns stored independently on a level-by-level basis. The base station (500) then sums the uniform width resource hopping patterns and computes the ensuing physical resource locations as needed.

In the illustrative example, the offset for the signal resource slot (546) is zero, the offset for a resource slot (547 or 548) at Level 2 is equal to minus one half or plus one half times the width of the resource slot (547 or 548), and the offset for a resource slot (549, 550, or 551) at Level 3 is equal to minus one, zero, or plus one times the width of the resource slot (549, 550, or 551). If a communication unit is either transmitting or receiving using a particular resource slot (e.g. 551) at Level 3, the base station (500) may compute the physical frequency location by adding the center of the signal resource region (540) to the offsets for one resource slot (546, 547, and 551) at each of Level 1, Level 2, and Level 3. Offsets for the other resource slots in the hierarchy may be computed in a similar manner. Resource slots are illustrated for Level 1 (546), Level 2 (547, 548), Level 3 (549, 550, 551, 552, 553, 554) and Level 4 (555, 556, 557, 558, 559, 560, 561, 562, 563, 564, 565, 566), with corresponding sizes for Level 1 (576), Level 2 (577, 578), Level 3 (579, 580, 581, 582, 583, 584) and Level 4 (585, 586, 587, 588, 589, 590, 591, 592, 593, 594, 595, 596), respectively. In addition, the signal resource region (540) itself is illustrated along with its corresponding size (542).

In another preferred embodiment, the base station (500) also retrieves physical resource locations from a stored table of physical resource locations. Each resource slot in the hierarchy has an entry in the table. This embodiment corresponds to having the sums of the uniform width resource hopping patterns which make up the set of hierarchical resource hopping patterns pre-computed and stored in a table. The base station (500) then retrieves the sums of the uniform width resource hopping patterns and the ensuing physical resource locations from the table as needed.

In the illustrative example, the physical resource location of the signal resource slot (546) at Level 1 of the hierarchical representation (545) of the signal resource region (540) is equal to the center of the signal resource region (540). The physical resource location of a resource slot (e.g. 547) at Level 2 is equal to the center of the resource region (540) minus one half times the width of the resource slot (547) at Level 2. Similarly, the physical resource location of the other resource slot (548) at Level 2 is equal to the center of the resource region (540) plus one half times the width of the resource slot (548). The remaining physical resource locations are derived and stored in a similar manner.

Figure 8:
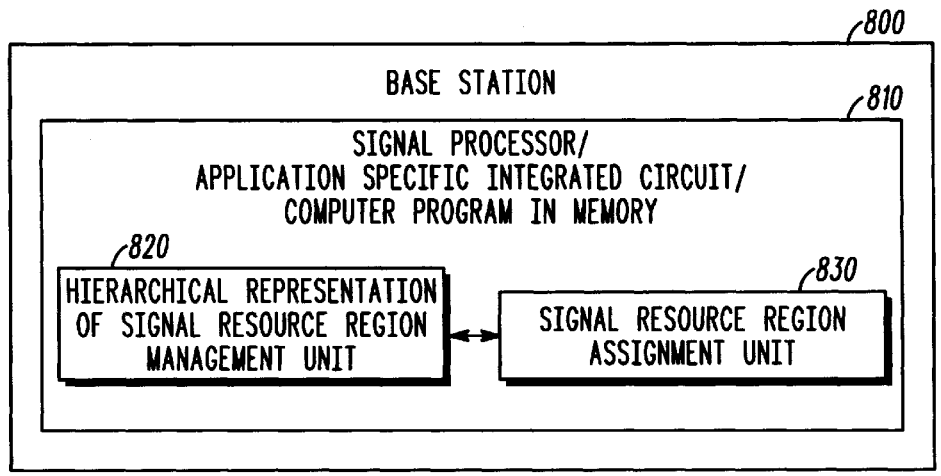
FIG. 8 is a diagrammatic representation of one embodiment of a base station having a signal processor/application specific integrated circuit/computer program in memory in accordance with the present invention.

FIG. 8 illustrates a base station (800) in accordance with one embodiment of the present invention. The base station (800) is an access control unit and contains a signal processor/application specific integrated circuit/computer program in memory (810). Furthermore, the signal processor/application specific integrated circuit/computer program in memory (810) contains a hierarchical representation of signal resource region management unit (820), which manages the hierarchical representation of the shared resource region, and a signal resource region assignment unit (830), which assigns communication units to appropriately sized resource slots.

Figure 6:
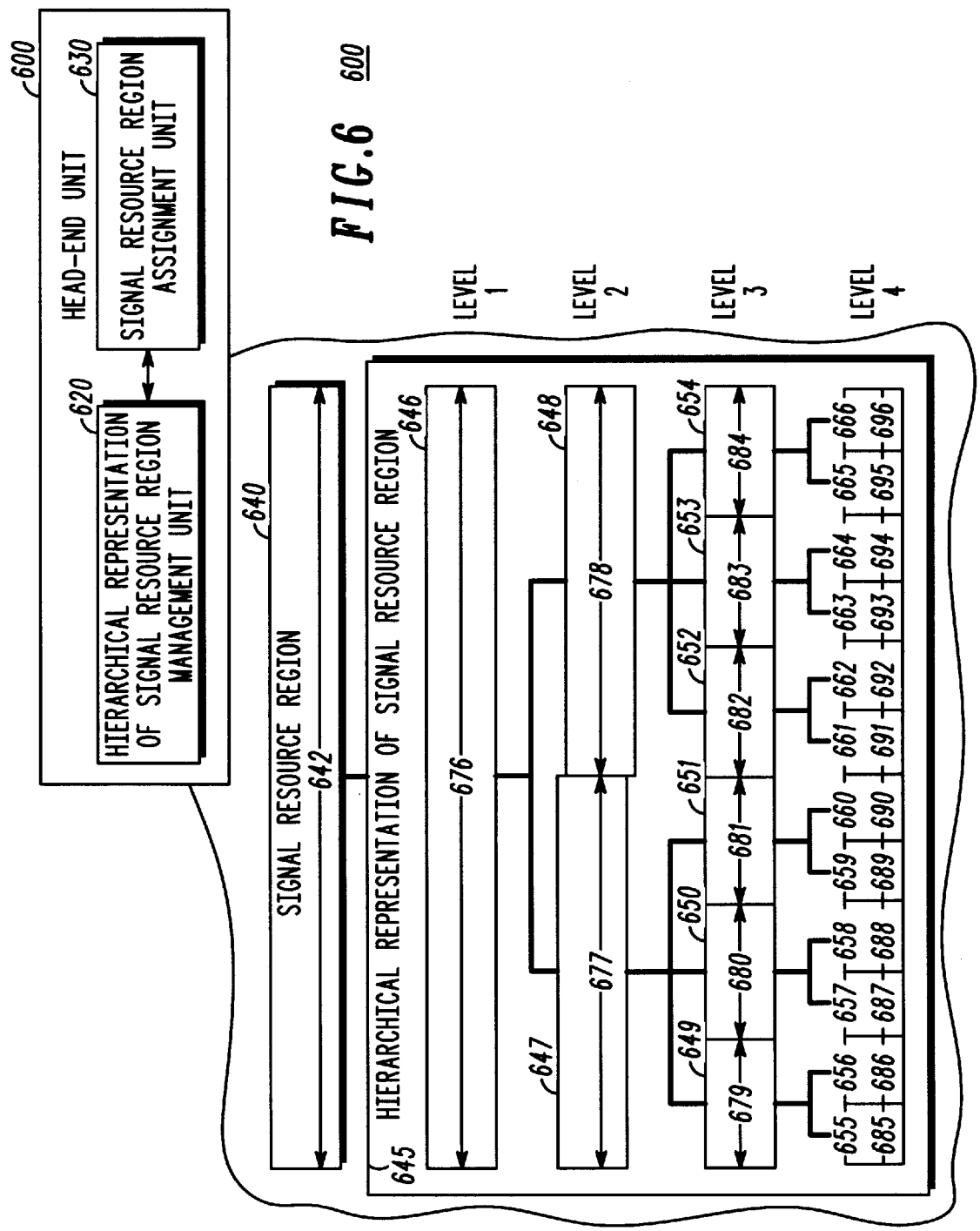
FIG. 6 is a diagrammatic representation of one embodiment of a head-end unit in accordance with the present invention.

FIG. 6 illustrates a head-end unit (600) in accordance with a one embodiment of the present invention. The head-end unit (600) is an access control unit. The head-end unit (600) manages the hierarchical representation (645) of the shared resource region (640) using a hierarchical representation of signal resource region management unit (620) and assigns communication units to appropriately sized resource slots within the hierarchy using a signal resource region assignment unit (630).

In a preferred embodiment, the head-end unit (600) also computes physical resource locations by summing down a chain of stored resource slot offsets. Each resource slot has an associated offset relative to the center of the resource slot one level above it in the hierarchy. These offsets are stored and an overall physical resource location is computed by summing the appropriate offsets. This embodiment corresponds to having the uniform width resource hopping patterns which make up the set of hierarchical resource hopping patterns stored independently on a level-by-level basis. The head-end unit (600) then sums the uniform width resource hopping patterns and computes the ensuing physical resource locations as needed.

In the illustrative example, the offset for the signal resource slot (646) is zero, the offset for a resource slot (647 or 648) at Level 2 is equal to minus one half or plus one half times the width of the resource slot (647 or 648), and the offset for a resource slot (649, 650, or 651) at Level 3 is equal to minus one, zero, or plus one times the width of the resource slot (649, 650, or 651). If a communication unit is either transmitting or receiving using a particular resource slot (e.g. 651) at Level 3, the head-end unit (600) may compute the physical frequency location by adding the center of the signal resource region (640) to the offsets for one resource slot (646, 647, and 651) at each of Level 1, Level 2, and Level 3. Offsets for the other resource slots in the hierarchy may be computed in a similar manner. Resource slots are illustrated for Level 1 (646), Level 2 (647, 648), Level 3 (649, 650, 651, 652, 653, 654) and Level 4 (655, 656, 657, 658, 659, 660, 661, 662, 663, 664, 665, 666), with corresponding sizes for Level 1 (676), Level 2 (677, 678), Level 3 (679, 680, 681, 682, 683, 684) and Level 4 (685, 686, 687, 688, 689, 690, 691, 692, 693, 694, 695, 696), respectively. In addition, the signal resource region (640) itself is illustrated along with its corresponding size (642).

In another preferred embodiment, the head-end unit (600) also retrieves physical resource locations from a stored table of physical resource locations. Each resource slot in the hierarchy has an entry in the table. This embodiment corresponds to having the sums of the uniform width resource hopping patterns which make up the set of hierarchical resource hopping patterns pre-computed and stored in a table. The head-end unit (600) then retrieves the sums of the uniform width resource hopping patterns and the ensuing physical resource locations from the table as needed.

In the illustrative example, the physical resource location of the signal resource slot (646) at Level 1 of the hierarchical representation (645) of the signal resource region (640) is equal to the center of the signal resource region (640). The physical resource location of a resource slot (e.g. 647) at Level 2 is equal to the center of the resource region (640) minus one half times the width of the resource slot (647) at Level 2. Similarly, the physical resource location of the other resource slot (648) at Level 2 is equal to the center of the resource region (640) plus one half times the width of the resource slot (648). The remaining physical resource locations are derived and stored in a similar manner.

Figure 9:
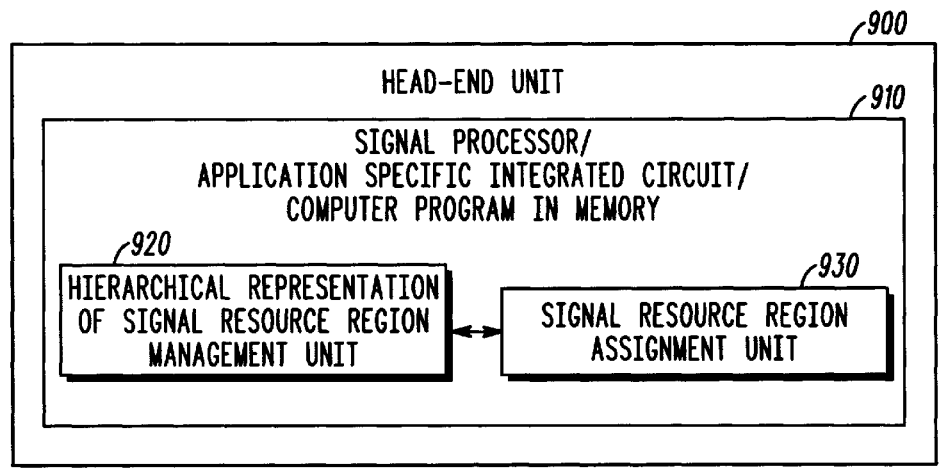
FIG. 9 is a diagrammatic representation of one embodiment of a head-end unit having a signal processor/application specific integrated circuit/computer program in memory in accordance with the present invention.

FIG. 9 illustrates a head-end unit (900) in accordance with one embodiment of the present invention. The head-end unit (900) is an access control unit and contains a signal processor/application specific integrated circuit/computer program in memory (910). Furthermore, the signal processor/application specific integrated circuit/computer program in memory (910) contains a hierarchical representation of signal resource region management unit (920), which manages the hierarchical representation of the shared resource region, and a signal resource region assignment unit (930), which assigns communication units to appropriately sized resource slots.

Figure 7:
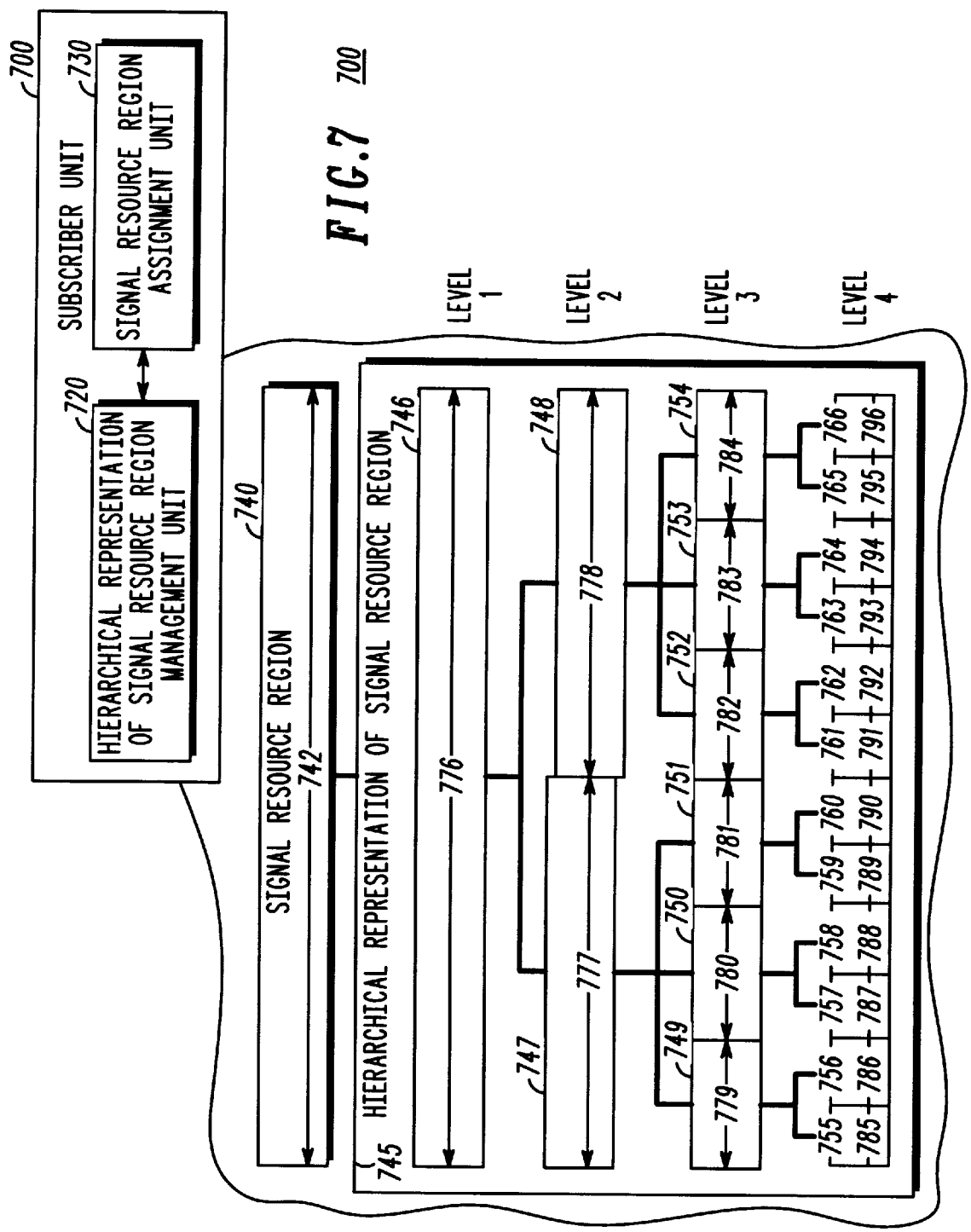
FIG. 7 is a diagrammatic representation of one embodiment of a subscriber unit in accordance with the present invention.

FIG. 7 illustrates a subscriber unit (700) in accordance with a one embodiment of the present invention. The subscriber unit (700) is an access control unit. The subscriber unit (700) manages the hierarchical representation (745) of the shared resource region (740) using a hierarchical representation of signal resource region management unit (720) and assigns communication units to appropriately sized resource slots within the hierarchy using a signal resource region assignment unit (730).

In a preferred embodiment, the subscriber unit (700) also computes physical resource locations by summing down a chain of stored resource slot offsets. Each resource slot has an associated offset relative to the center of the resource slot one level above it in the hierarchy. These offsets are stored and an overall physical resource location is computed by summing the appropriate offsets. This embodiment corresponds to having the uniform width resource hopping patterns which make up the set of hierarchical resource hopping patterns stored independently on a level-by-level basis. The subscriber unit (700) then sums the uniform width resource hopping patterns and computes the ensuing physical resource locations as needed.

In the illustrative example, the offset for the signal resource slot (746) is zero, the offset for a resource slot (747 or 748) at Level 2 is equal to minus one half or plus one half times the width of the resource slot (747 or 748), and the offset for a resource slot (749, 750, or 751) at Level 3 is equal to minus one, zero, or plus one times the width of the resource slot (749, 750, or 751). If a communication unit is either transmitting or receiving using a particular resource slot (e.g. 751) at Level 3, the subscriber unit (700) may compute the physical frequency location by adding the center of the signal resource region (740) to the offsets for one resource slot (746, 747, and 751) at each of Level 1, Level 2, and Level 3. Offsets for the other resource slots in the hierarchy may be computed in a similar manner. Resource slots are illustrated for Level 1 (746), Level 2 (747, 748), Level 3 (749, 750, 751, 752, 753, 754) and Level 4 (755, 756, 757, 758, 759, 760, 761, 762, 763, 764, 765, 766), with corresponding sizes for Level 1 (776), Level 2 (777, 778), Level 3 (779, 780, 781, 782, 783, 784) and Level 4 (785, 786, 787, 788, 789, 790, 791, 792, 793, 794, 795, 796), respectively. In addition, the signal resource region (740) itself is illustrated along with its corresponding size (742).

In another preferred embodiment, the subscriber unit (700) also retrieves physical resource locations from a stored table of physical resource locations. Each resource slot in the hierarchy has an entry in the table. This embodiment corresponds to having the sums of the uniform width resource hopping patterns which make up the set of hierarchical resource hopping patterns pre-computed and stored in a table. The subscriber unit (700) then retrieves the sums of the uniform width resource hopping patterns and the ensuing physical resource locations from the table as needed.

In the illustrative example, the physical resource location of the signal resource slot (746) at Level 1 of the hierarchical representation (745) of the signal resource region (740) is equal to the center of the signal resource region (740). The physical resource location of a resource slot (e.g. 747) at Level 2 is equal to the center of the resource region (740) minus one half times the width of the resource slot (747) at Level 2. Similarly, the physical resource location of the other resource slot (748) at Level 2 is equal to the center of the resource region (740) plus one half times the width of the resource slot (748). The remaining physical resource locations are derived and stored in a similar manner.

Figure 10:
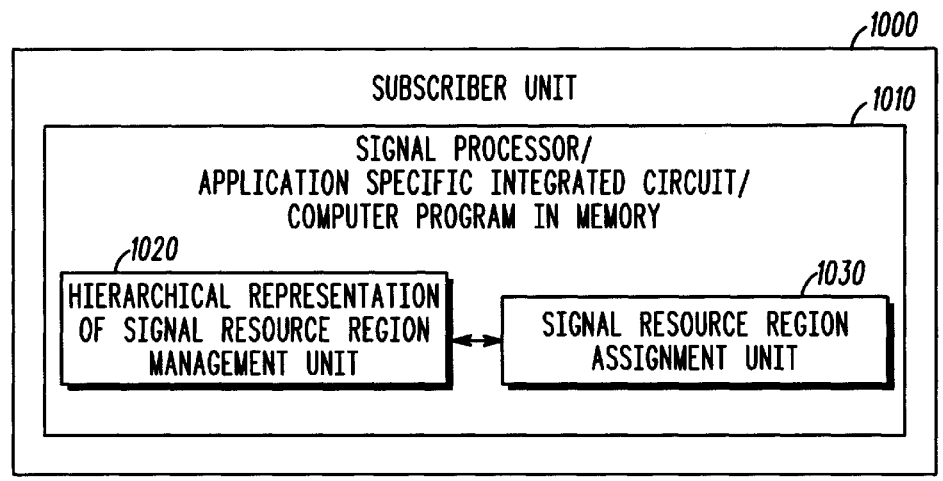
FIG. 10 is a diagrammatic representation of one embodiment of a subscriber unit having a digital signal processor/application specific integrated circuit/computer program in memory in accordance with the present invention.

FIG. 10 illustrates a subscriber unit (1000) in accordance with one embodiment of the present invention. The subscriber unit (1000) is an access control unit and contains a signal processor/application specific integrated circuit/computer program in memory (1010). Furthermore, the signal processor/application specific integrated circuit/computer program in memory (1010) contains a hierarchical representation of signal resource region management unit (1020), which manages the hierarchical representation of the shared resource region, and a signal resource region assignment unit (1030), which assigns communication units to appropriately sized resource slots.

FIG. 3, numeral 300, illustrates a flow diagram of steps executed to enable efficient resource hopping in a communication system or group of communication systems supporting a plurality of radios with varying resource size requirements in accordance with a preferred embodiment of the present invention. When a communication unit requests assignment to the signal resource region, either for transmission and/or reception purposes, depending on the resource size requirements of the communication unit, the access control unit assigns (310) the communication unit to an initial resource slot in a hierarchical level within a hierarchical representation of the resource region, and to a hierarchical resource hopping pattern based on a hierarchical resource hopping scheme. Then the communication unit begins hopping, i.e., the communication unit begins transmission/reception in its assigned initial resource slot, and after each hopping cycle, each communication unit potentially switches its signal to another resource slot according to a predetermined hierarchical resource hopping pattern based on a hierarchical resource hopping scheme (320). This hierarchical resource hopping pattern based on a hierarchical resource hopping scheme includes a combination of hopping patterns from a plurality of hierarchical levels, which, in turn, require hopping, independently on a resource slot by resource slot basis, of the contents of each resource slot on each level of the hierarchical representation of the resource region using a uniform width hopping method.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method for providing efficient resource hopping for one of: a communication system and a group of communication systems, supporting a plurality of communication units, where the communication units have resource size requirements that may differ, comprising the steps of:

A) assigning a communication unit to an initial resource slot in a hierarchical level, and to a hierarchical resource hopping pattern based on a predetermined hierarchical resource hopping scheme; and B) hopping, by the communication unit in accordance with the predetermined hierarchical resource hopping scheme.

2. The method of claim 1 where the hierarchical level is one level of a plurality of levels of a hierarchical representation of a resource region.

3. The method of claim 2 where assignment to an initial resource slot in the hierarchical level is made in accordance with a resource size requirement of the communication unit.

4. The method of claim 2 where the hierarchical level is selected wherein a size of a resource slot on a selected level is both:

A) greater than or equal to a resource size requirement of the communication unit, and B) less than twice the resource size requirement of the communication unit.

5. The method of claim 2 where the hierarchical level is selected wherein:

A) a size of a resource slot on a selected level is greater than or equal to a resource size requirement of the communication unit, and B) a size of a resource slot on a next hierarchical level is less than the resource size requirement of the communication unit.

6. The method of claim 1 wherein the resource slot is based on one of:

A) frequency;

B) time; and

C) code.

7. The method of claim 1 wherein a resource slot is based on a combination of time and frequency.

8. The method of claim 2 wherein the plurality of levels of the hierarchical representation of the resource region are derived from a recursive division of the resource region from a first level having one or more largest defined size resource slots to an nth level, n a predetermined integer, having a plurality of smallest defined size resource slots.

9. The method of claim 2 wherein a size of a smallest defined size resource slots is greater than or equal to a smallest signal size utilized by the plurality of communication units.

10. The method of claim 2 wherein a size of a largest defined size resource slot is greater than or equal to a largest signal size utilized by the plurality of communication units.

11. The method of claim 2 wherein a number of resource slots in a level is multiple of a number of resource slots in a previous level.

12. The method of claim 2 wherein a fixed, non-hopped, portion of a resource region contains a reference signal.

13. The method of claim 12 wherein the reference signal is used to facilitate synchronization of the communication unit to the hierarchical hopping scheme.

14. The method of claim 2 where one of the levels of the hierarchical representation of the resource region contains a reference signal.

15. The method of claim 14 wherein the reference signal is used to facilitate synchronization of the communication unit to the hierarchical hopping scheme.

16. The method of claim 14 wherein the reference signal occupies a single slot within one of the levels of the hierarchical representation of the resource region.

17. The method of claim 14 wherein the reference signal occupies all the slots within one of the levels of the hierarchical representation of the resource region.

18. The method of claim 2 where the hierarchical resource hopping pattern based on a predetermined hierarchical resource hopping scheme comprises a combination of hopping patterns from a plurality of hierarchical levels.

19. The method of claim 18 wherein the hopping patterns from a plurality of hierarchical levels comprise hopping, independently on a resource slot by resource slot basis, of contents of each resource slot on each level of the hierarchical representation of the resource region using a uniform slot width hopping method.

20. The method of claim 19 wherein all the resource slots on a level of the hierarchical representation of the resource region use a same uniform slot width hopping scheme.

21. The method of claim 19 wherein the uniform slot width hopping scheme computes a physical resource location.

22. The method of claim 19 wherein the uniform slot width hopping scheme retrieves a physical resource location from a stored table of resource locations.

23. The method of claim 19 wherein the uniform slot width hopping method is one of: modified, and replaced in accordance with a predetermined modification-replacement scheme.

24. The method of claim 8 wherein the plurality of levels of the hierarchical representation of the resource region is one of: modified, and replaced in accordance with a predetermined modification-replacement scheme.

25. The method of claim 24 where an additional level is added to the plurality of levels of the hierarchical representation of the resource region.

26. The method of claim 24 where a level is removed from the plurality of levels of the hierarchical representation of the resource region.

27. The method of claim 1 wherein the method is implemented by at least one of:
   A) a signal processor;
   B) an application specific integrated circuit; and
   C) a computer program stored in a memory.

28. A system for providing an efficient resource hopping scheme for one of: a communication system and a group of communication systems, supporting a plurality of communication units, where the communication units have resource size requirements that may differ, comprising:
   A) an access control unit, arranged to receive and transmit signals from/to communication units, for assigning a communication unit to an initial resource slot in a hierarchical level and to a hierarchical resource hopping pattern based on a predetermined hierarchical resource hopping scheme; and
   B) a plurality of communication units each having a resource size requirement, arranged to transmit and receive signals to/from one of: the access control unit and another communication unit, for hopping in accordance with a predetermined hierarchical resource hopping scheme.

29. The system of claim 28 where the hierarchical level is one level of a plurality of levels of a hierarchical representation of a resource region.

30. The system of claim 29 where the assigning to an initial resource slot in the hierarchical level is made in accordance with a resource size requirement of the communication unit.

31. The system of claim 29 where the hierarchical level is selected wherein a size of a resource slot on a selected level is both:
   A) greater than or equal to a resource size requirement of the communication unit, and
   B) less than twice the resource size requirement of the communication unit.

32. The system of claim 29 where the hierarchical level is selected wherein:
   A) a size of a resource slot on a selected level is greater than or equal to a resource size requirement of the communication unit, and
   B) a size of a resource slot on a next hierarchical level is less than the resource size requirement of the communication unit.

33. The system of claim 28 wherein the resource slot is based on one of:
   A) frequency;
   B) time; and
   C) code.

34. The system of claim 28 wherein the initial resource slot is based on a combination of time and frequency.

35. The system of claim 29 wherein the plurality of levels of the hierarchical representation of the resource region are derived from a recursive division of the resource region from a first level having one or more largest defined size resource slots to an nth level, na predetermined integer, having a plurality of smallest defined size resource slots.

36. The system of claim 29 wherein a size of a smallest defined size resource slots is greater than or equal to a smallest signal size utilized by the plurality of communication units.

37. The system of claim 29 wherein a size of a largest defined size resource slot is greater than or equal to a largest signal size utilized by the plurality of communication units.

38. The system of claim 29 wherein a number of resource slots in a level is multiple of a number of resource slots in a previous level.

39. The system of claim 29 wherein a fixed, non-hopped, portion of a resource region contains a reference signal.

40. The system of claim 39 wherein the reference signal is used to facilitate synchronization of the communication unit to the hierarchical hopping scheme.

41. The system of claim 29 where one of the levels of the hierarchical representation of the resource region contains a reference signal.

42. The system of claim 41 wherein the reference signal is used to facilitate synchronization of the communication unit to the hierarchical hopping scheme.

43. The system of claim 41 wherein the reference signal occupies a single slot within one of the levels of the hierarchical representation of the resource region.

44. The system of claim 41 wherein the reference signal occupies all the slots within one of the levels of the hierarchical representation of the resource region.

45. The system of claim 29 where the hierarchical resource hopping pattern based on a predetermined hierarchical resource hopping scheme comprises a combination of hopping patterns from a plurality of hierarchical levels.

46. The system of claim 45 wherein the hopping patterns from a plurality of hierarchical levels comprise hopping, independently on a resource slot by resource slot basis, of contents of each resource slot on each level of the hierarchical representation of the resource region using a uniform slot width hopping scheme.

47. The system of claim 46 wherein all the resource slots on a level of the hierarchical representation of the resource region use a same uniform slot width hopping scheme.

48. The system of claim 46 wherein the uniform slot width hopping scheme computes a physical resource location.

49. The system of claim 46 wherein the uniform slot width hopping scheme retrieves a physical resource location from a stored table of resource locations.

50. The system of claim 46 wherein the uniform slot width hopping scheme is one of: modified, and replaced in accordance with a predetermined modification-replacement scheme.

51. The system of claim 35 wherein the plurality of levels of the hierarchical representation of the resource region is one of: modified, and replaced in accordance with a predetermined modification-replacement scheme.

52. The system of claim 51 where an additional level is added to the plurality of levels of the hierarchical representation of the resource region.

53. The system of claim 51 where a level is removed from the plurality of levels of the hierarchical representation of the resource region.

54. The system of claim 28 wherein the efficient resource hopping scheme is implemented by at least one of:
   A) a signal processor;
   B) an application specific integrated circuit; and
   C) a computer program stored in a memory.

55. A base station/head-end unit/subscriber unit having an access control unit arranged to receive and transmit signals from/to communication units, for providing an efficient resource hopping scheme for one of: a communication system and a group of communication systems, supporting a plurality of communication units, where the communication units have resource size requirements that may differ, the access control unit comprising:

A) a signal resource region assignment unit for assigning a communication unit to an initial resource slot in a hierarchical level, and B) a hierarchical representation of signal resource region management unit, for providing a resource hopping pattern based on a predetermined hierarchical resource hopping scheme.

56. The base station/head-end unit/subscriber unit of claim 55 where the hierarchical level is one level of a plurality of levels of a hierarchical representation of a resource region.

57. The base station/head-end unit/subscriber unit of claim 56 where the assignment to the initial resource slot in the hierarchical level is made in accordance with the resource size requirement of the communication unit.

58. The base station/head-end unit/subscriber unit of claim 56 where the hierarchical level is selected wherein the size of the resource slot on a selected level is both:

A) greater than or equal to a resource size requirement of the communication unit, and B) less than twice the resource size requirement of the communication unit.

59. The base station/head-end unit/subscriber unit of claim 56 where the hierarchical level is selected wherein:

A) a size of a resource slot on a selected level is greater than or equal to a resource size requirement of the communication unit, and B) a size of a resource slot on a next hierarchical level is less than the resource size requirement of the communication unit.

60. The base station/head-end unit/subscriber unit of claim 55 wherein the resource slot is based on one of:

A) frequency;

B) time; and

C) code.

61. The base station/head-end unit/subscriber unit of claim 55 wherein the initial resource slot is based on a combination of time and frequency.

62. The base station/head-end unit/subscriber unit of claim 56 wherein the plurality of levels of the hierarchical representation of the resource region are derived from a recursive division of the resource region from a first level having one or more largest defined size resource slots to an nth level having a plurality of smallest defined size resource slots.

63. The base station/head-end unit/subscriber unit of claim 56 wherein a size of the smallest defined size resource slots is greater than or equal to a smallest signal size utilized by the plurality of communication units.

64. The base station/head-end unit/subscriber unit of claim 56 wherein a size of the largest defined size resource slot is greater than or equal to a largest signal size utilized by the plurality of communication units.

65. The base station/head-end unit/subscriber unit of claim 56 wherein a number of resource slots in a level is multiple of a number of resource slots in a previous level.

66. The base station/head-end unit/subscriber unit of claim 56 wherein a fixed, non-hopped, portion of a resource region contains a reference signal.

67. The base station/head-end unit/subscriber unit of claim 66 wherein the reference signal is used to facilitate synchronization of the communication unit to the hierarchical hopping scheme.

68. The base station/head-end unit/subscriber unit of claim 56 where one of the levels of the hierarchical representation of the resource region contains a reference signal.

69. The base station/head-end unit/subscriber unit of claim 68 wherein the reference signal is used to facilitate synchronization of the communication unit to the hierarchical hopping scheme.

70. The base station/head-end unit/subscriber unit of claim 68 wherein the reference signal occupies a single slot within one of the levels of the hierarchical representation of the resource region.

71. The base station/head-end unit/subscriber unit of claim 68 wherein the reference signal occupies all of the slots within one of the levels of the hierarchical representation of the resource region.

72. The base station/head-end unit/subscriber unit of claim 56 where the hierarchical resource hopping pattern based on a predetermined hierarchical resource hopping scheme comprises a combination of hopping patterns from a plurality of hierarchical levels.

73. The base station/head-end unit/subscriber unit of claim 72 wherein the hopping patterns from a plurality of hierarchical levels comprise hopping, independently on a resource slot by resource slot basis, of the contents of each resource slot on each level of the hierarchical representation of the resource region using a uniform slot width hopping scheme.

74. The base station/head-end unit/subscriber unit of claim 73 wherein all the resource slots on a level of the hierarchical representation of the resource region use the same uniform width hopping scheme.

75. The base station/head-end unit/subscriber unit of claim 73 wherein the uniform slot width hopping scheme computes a physical resource location.

76. The base station/head-end unit/subscriber unit of claim 73 wherein the uniform slot width hopping scheme retrieves a physical resource location from a stored table of resource locations.

77. The base station/head-end unit/subscriber unit of claim 73 wherein the uniform slot width hopping scheme is one of: modified, and replaced in accordance with a predetermined modification-replacement scheme.

78. The base station/head-end unit/subscriber unit of claim 62 wherein the plurality of levels of the hierarchical representation of the resource region is one of: modified, and replaced in accordance with a predetermined modification-replacement scheme.

79. The base station/head-end unit/subscriber unit of claim 78 where an additional level is added to the plurality of levels of the hierarchical representation of the resource region.

80. The base station/head-end unit/subscriber unit of claim 78 where a level is removed from the plurality of levels of the hierarchical representation of the resource region.

81. The base station/head-end unit/subscriber unit of claim 55 wherein the efficient resource hopping scheme is implemented by at least one of:

A) a signal processor;

B) an application specific integrated circuit; and

C) a computer program stored in a memory.

* * * * *